(12) United States Patent
Poole et al.

(10) Patent No.: US 6,955,845 B1
(45) Date of Patent: Oct. 18, 2005

(54) ACOUSTICAL AND THERMAL INSULATOR

(75) Inventors: Paul Warren Poole, Huntersville, NC (US); Thomas Troy Block, Howell, MI (US); Jeffrey Allan Tilton, Louisville, KY (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 117 days.

(21) Appl. No.: 09/607,481

(22) Filed: Jun. 30, 2000

(51) Int. Cl.[7] .............................. B32B 1/04; B32B 3/02
(52) U.S. Cl. ........................... 428/76; 428/74; 428/71; 428/36.4; 428/36.3; 428/35.8; 428/36.1; 296/39.3
(58) Field of Search .................... 428/317.9, 319.7, 428/319.9, 543, 76, 74, 75, 70, 71, 35.7, 428/36.5, 36.4, 36.3, 35.8, 36.1; 52/406.1, 52/400.2, 406.3; 296/39.3

(56) References Cited

U.S. PATENT DOCUMENTS

| | | | |
|---|---|---|---|
| 3,752,060 A | 8/1973 | Hubert et al. | |
| 3,787,278 A | 1/1974 | Ready et al. | |
| 3,975,562 A | 8/1976 | Madebach et al. | |
| 4,016,318 A | 4/1977 | DiGioia et al. | |
| 4,020,207 A | 4/1977 | Alfter et al. | |
| 4,131,664 A | 12/1978 | Flowers et al. | |
| 4,242,398 A | 12/1980 | Segawa et al. | |
| 4,282,283 A | 8/1981 | George et al. | |
| 4,304,824 A * | 12/1981 | Karpinski ............... 428/69 | |
| 4,377,614 A | 3/1983 | Alfter et al. | |
| 4,379,801 A | 4/1983 | Weaver et al. | |
| 4,379,802 A | 4/1983 | Weaver et al. | |
| 4,395,455 A | 7/1983 | Frankosky | |
| 4,418,031 A | 11/1983 | Doerer et al. | |
| 4,432,580 A | 2/1984 | Lohmar et al. | |
| 4,438,166 A * | 3/1984 | Gluck et al. ............. 428/113 | |
| 4,539,254 A | 9/1985 | O'Connor et al. | |
| 4,579,764 A | 4/1986 | Peoples, Jr. et al. | |
| 4,711,685 A | 12/1987 | Hillman | |
| 4,824,507 A | 4/1989 | D'Amico | |
| 4,888,234 A | 12/1989 | Smith et al. | |
| 4,940,112 A | 7/1990 | O'Neill | |
| 4,946,738 A | 8/1990 | Chenoweth et al. | |
| 4,948,660 A | 8/1990 | Rias et al. | |
| 4,985,106 A * | 1/1991 | Nelson ................... 156/276 | |
| 5,047,198 A | 9/1991 | Kim | |
| 5,055,341 A | 10/1991 | Yamaji et al. | |
| 5,066,351 A | 11/1991 | Knoll | |
| 5,079,074 A | 1/1992 | Steagall et al. | |
| 5,094,318 A | 3/1992 | Maeda et al. | |
| 5,108,691 A | 4/1992 | Elliott | |
| 5,164,254 A | 11/1992 | Todd et al. | |
| 5,204,042 A | 4/1993 | James et al. | |
| 5,283,111 A | 2/1994 | Schlecker | |

(Continued)

FOREIGN PATENT DOCUMENTS

DE    41 26 884 A1    2/1993

(Continued)

*Primary Examiner*—Michael C. Miggins
(74) *Attorney, Agent, or Firm*—Inger H. Eckert; Maria C. Gasaway

(57) ABSTRACT

An acoustical and thermal insulator in the form of a multi-layer composite includes a first facing layer such as a heat reflective material layer, a polymer based blanket layer and an insulation insert encapsulated in the polymer based blanket layer. The insulator may also include a second facing layer. The insulation insert is sized and positioned in the insulator so as to provide extra thermal insulation at selected hot spots and/or extra acoustical insulation at high noise points of a vehicle to which the insulator may be mounted.

18 Claims, 1 Drawing Sheet

U.S. PATENT DOCUMENTS

| | | | |
|---|---|---|---|
| 5,296,657 A | 3/1994 | Gilliland et al. | |
| 5,298,319 A | 3/1994 | Donahue et al. | |
| 5,298,694 A | 3/1994 | Thompson et al. | |
| 5,366,678 A * | 11/1994 | Nomizo et al. | 264/122 |
| 5,376,322 A | 12/1994 | Younessian | |
| 5,501,898 A | 3/1996 | Fottinger et al. | |
| 5,549,776 A | 8/1996 | Juriga | |
| 5,633,064 A | 5/1997 | Ragland et al. | |
| 5,741,380 A | 4/1998 | Hoyle et al. | |
| 5,743,985 A | 4/1998 | Ernest et al. | |
| 5,749,993 A | 5/1998 | Denney et al. | |
| 5,756,026 A | 5/1998 | Sanchez et al. | |
| 5,800,905 A | 9/1998 | Sheridan et al. | |
| 5,817,408 A | 10/1998 | Orimo et al. | |
| 5,841,081 A | 11/1998 | Thompson et al. | |
| 5,872,067 A | 2/1999 | Meng et al. | |
| 5,886,306 A | 3/1999 | Patel et al. | |
| 5,932,331 A | 8/1999 | Jones et al. | |
| 5,958,603 A | 9/1999 | Ragland et al. | |
| RE36,323 E | 10/1999 | Thompson et al. | |
| 5,972,445 A | 10/1999 | Kimura et al. | |
| 5,975,609 A | 11/1999 | Campbell | |
| 5,979,962 A | 11/1999 | Valentin et al. | |
| 6,093,481 A * | 7/2000 | Lynn et al. | 428/217 |
| 6,096,416 A * | 8/2000 | Altenberg | 428/317.7 |
| 6,343,954 B1 * | 2/2002 | Facciano et al. | 439/604 |

FOREIGN PATENT DOCUMENTS

| | | |
|---|---|---|
| EP | 0 229 977 A2 | 7/1987 |
| JP | 10060763 A | 3/1998 |
| WO | WO 97/17508 | 5/1997 |

* cited by examiner

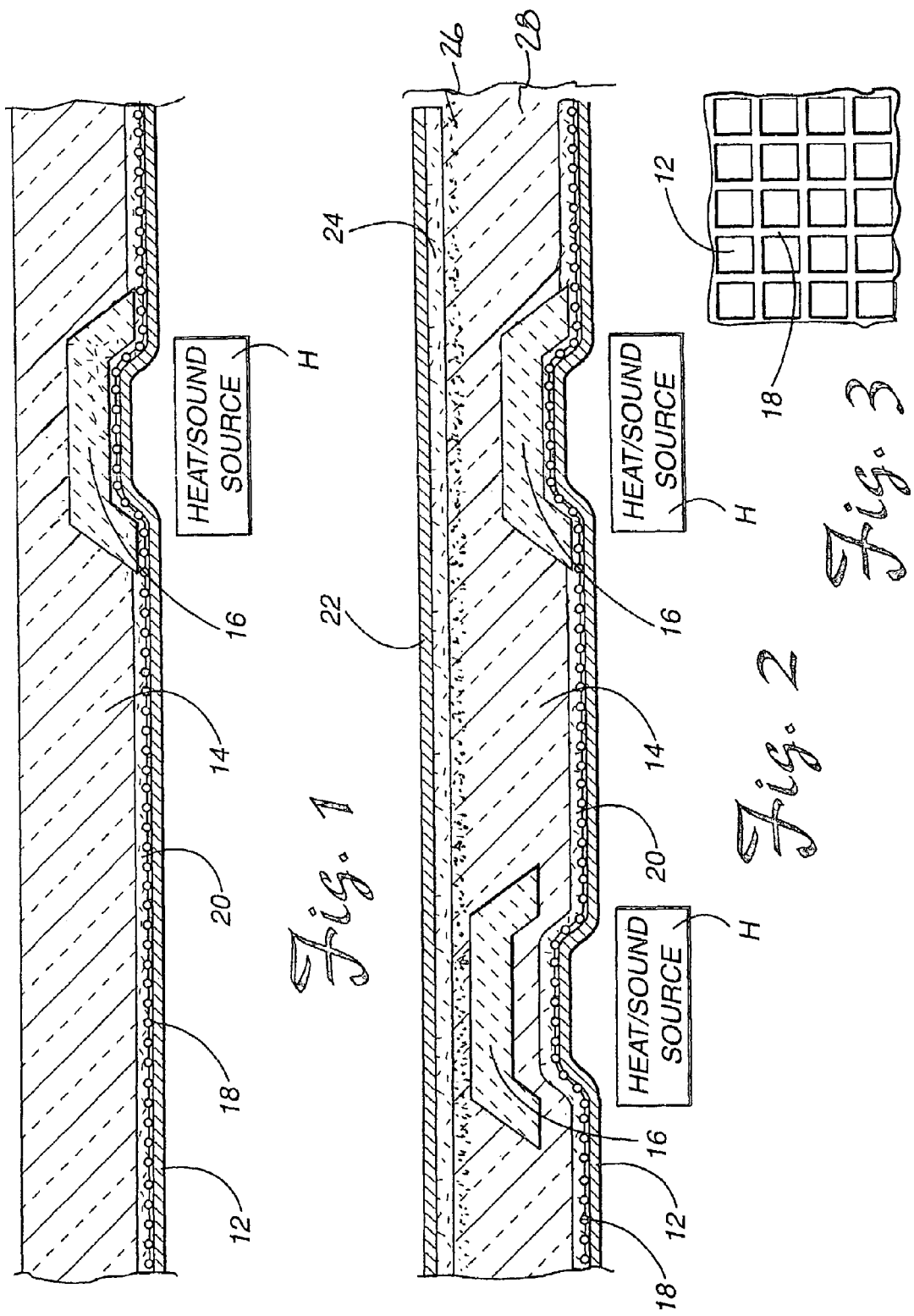

ACOUSTICAL AND THERMAL INSULATOR

TECHNICAL FIELD AND INDUSTRIAL APPLICABILITY OF THE INVENTION

The present invention relates generally to an acoustical and thermal insulator which may be utilized to insulate an environment such as a passenger compartment of a vehicle from the heat and sound generated by mechanical components such as the motor, drive train, suspension, tires and exhaust system of that vehicle.

BACKGROUND OF THE INVENTION

It is well known in the art to provide acoustical and thermal insulators on an automobile, truck or other vehicle in an effort to protect and insulate the operating or passenger compartment from the noise and heat generated by the mechanical equipment of the associated vehicle. Toward this end, mats of high temperature glass fibers have been utilized, eg. (a) on the fire wall between the dashboard and engine compartment and (b) along the floor pan of the vehicle between the passenger compartment and the drive line and exhaust system. These materials provide heat insulation which makes it possible to maintain cooler and more comfortable temperatures in the operator/passenger compartment particularly during the summer months. Additionally, these materials provide needed sound insulation, reducing or eliminating various mechanical sounds of the motor, drive train as well as the suspension and tires as the vehicle travels over the often rough and bumpy surface of the roadway.

Prior art examples of heat and sound insulating materials, mats and panels are found in a number of patents including U.S. Pat. No. 4,948,660 to Rias et al., U.S. Pat. No. 5,283,111 to Schlecker and U.S. Pat. No. 5,633,064 to Ragland et al.

The Rias et al. patent discloses a heat and sound insulating panel including an outer paint coating, a sheet of glass fibers, an aluminum film, a heat sealing film of polyethylene and an insulating mineral fiber layer mat. In the Schlecker patent, a multi-layered composite is disclosed including a woven polyethylene/polypropylene mat, a reflective layer of aluminized polyester or polypropylene and an insulating layer of non-woven batt of insulating textile fibers including glass. The insulating layer may include a scrim of polyester with the fibers of the batt needle punched into the scrim.

In both the Rias et al. and Schlecker references, the heat reflective foil is provided as an interior layer rather than an outer layer of the insulator or panel. This allows heat to build up in at least the outer layers of the insulator or panel between the metallic film and the heat source. This adsorption of heat limits construction material selection to relatively high melting point materials and reduces cooling efficiency of the surrounding mechanical components. Over time this allows a greater transfer of heat into the operator/passenger compartment of the vehicle.

In the Ragland et al. reference, a heat barrier laminate is provided having a metal layer adhesively bonded on one side to an insulating layer and on the other side to a flame retardant layer. A second metal layer is bonded to the other side of the insulating layer. While such an insulator provides very good thermal insulation, it does not provide the best acoustical insulation. Further, while good thermal insulation is provided, the use of two metallic foil layers adds significantly to the cost of manufacturing the insulator or panel. The two foil layers also tend to trap heat between the layers by reflecting heat back and forth. This can limit the selection of materials for the insulating layer to those with higher melting points. For certain applications this may eliminate one from possibly using a material with more desirable acoustical and/or thermal insulating properties. Accordingly, a need is identified for an improved insulator or panel providing superior acoustical and thermal insulation properties at a reduced overall manufacturing cost.

SUMMARY OF THE INVENTION

In accordance with the purposes of the present invention as described herein, an improved acoustical and thermal insulator is provided. That insulator comprises a multi-layer composite including (a) a first facing layer such as a heat reflective material layer, (b) a polymer based blanket layer and (c) an insulation insert encapsulated by the polymer based blanket layer and the heat reflective material layer. In use on a vehicle, the insulator is mounted with the first facing or heat reflective layer closest to the heat source so that the heat is reflected away from the passenger compartment without allowing it to be adsorbed by the insulator. Accordingly, the heat reflective material layer also protects the remaining portions of the insulator including the fiber blanket layer from high temperatures. Consequently, materials with relatively lower melting points but strong thermal and acoustical insulating properties may be selected for the polymer based blanket layer so as to more effectively insulate the passenger compartment from mechanical and road sounds and/or vehicle heat sources. In certain areas and particularly those adjacent high temperature heat sources such as the catalytic converter of the exhaust system, the insulator includes a highly efficient thermal insulation insert. Such an insert provides extra heat protection at the "hot spots" in order to ensure adequate thermal insulation and the greatest possible comfort level for the passengers in the vehicle operator/passenger compartment.

More specifically describing the invention, the heat reflective material layer may be a metallic foil of aluminum or other heat reflective metal. The metallic foil has a thickness between substantially 0.5–5.0 mil depending upon the temperature, durability and structural requirements of the particular application. That metallic foil may also include a reinforcement for extra strength and durability. Reinforcement may take the form of scrims, fibrous mats and fibrous webs. A strong material such as fiberglass may be used.

The polymer based blanket layer primarily functions to provide both thermal and acoustical insulation so as to provide a relatively noise free and more comfortable passenger compartment for the convenience and satisfaction of the vehicle operator and any passengers. The polymer based blanket material may also be molded to include a relatively high density section and a relatively low density section. The high density section acts as an outer skin to protect the polymer based blanket layer from being torn, cut or damaged during the process of installing the insulator on the vehicle. Further, since the insulation insert is encapsulated in the polymer based blanket layer, it is also protected by this thick high density outer skin.

The polymer based blanket material may be made from any polymer exhibiting the necessary thermal and acoustical properties required for the particular application. Possible materials include polyester fiber mat and other fibrous materials such as polyolefins, polyethylene, cotton shoddy, nylon, rayon, acrylic, natural fibers (eg. kenaf, hemp) and combinations thereof with or without melt blown microfibers.

The insulation insert is selected from a group of materials consisting of fiberglass, high-temperature foam, polymer based blanket material, natural fiber based blanket material and combinations thereof. When the insert is utilized for thermal insulation of hot spots it is important to select materials that do not smoke when exposed to temperatures as high as eg. 450° F.

For most applications, it is desirable to position the insulation insert in the fiber blanket layer at selected locations such as adjacent significant heat sources such as a catalytic converter. This allows the best thermal shielding of the heat source while minimizing the amount of the more expensive thermal insulation insert material necessary to make the insulator.

In accordance with yet another aspect of the present invention, the insulator may include a second facing layer. That second facing layer may include a scrim for added strength and tear resistance. The second facing layer may be selected from a group of materials consisting of polyester, polypropylene, rayon, nylon, glass, a metal foil and combinations thereof. Either or both of the first and second facing layers may be treated with a fire retardant, a biocide and/or a colorant to provide additional desired properties.

Still further, the first facing or heat reflective material layer includes a heat activated adhesive to secure the layer to the fiber blanket layer. A similar heat activated adhesive may be provided for securing the second facing layer to the fiber blanket layer. The heat activated adhesive is selected from a group of materials consisting of thermoplastic sheet, thermoplastic web, hot melt, latex and heat activated resins appropriate for the intended purpose.

The following description shows and describes several embodiments of this invention simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is a cross sectional view of a first embodiment of the acoustical and thermal insulator of the present invention including a heat reflective material layer, a fiber blanket layer and a thermal insulation insert encapsulated by the heat reflective layer and the fiber blanket layer shown overlying a heat/sound source;

FIG. 2 is a cross sectional view of an alternative embodiment of the insulator of the present invention including the three layers shown in FIG. 1 and an additional facing layer; and FIG. 3 is a detailed top plan, cutaway view of the insulator showing the fiber pattern of the scrim reinforcing the heat reflective layer.

Reference will now be made in detail to the present preferred embodiments of the invention, examples of which are illustrated in the accompanying drawing.

DETAILED DESCRIPTION AND PREFERRED EMBODIMENTS OF THE INVENTION

Reference is now made to FIG. 1 showing a first embodiment of the acoustical and thermal insulator 10 of the present invention. The insulator 10 comprises a multilayer composite including a first facing layer such as a heat reflective layer 12, a polymer based blanket layer 14 and an insulation insert 16 that is encapsulated by the heat reflective layer and the polymer based blanket layer.

The first facing layer 12 may be made from polyester, polypropylene, rayon, nylon, glass and any combination thereof. In applications requiring superior heat insulative characteristics, the facing layer 12 may be formed from a heat reflective material such as a metallic foil (eg. aluminum or other heat reflective metal). Where a metallic foil is used foil thickness is generally in the range of 0.5–5.0 mil. In most applications, a foil thickness of between substantially 0.5–2.0 mil (e.g. 1.0 mil) is used. The thickness selected is based upon the temperature, durability and structural requirements of the particular product application.

The first facing layer 12 may be reinforced or non-reinforced. Reinforcements 18 are included to add durability and structural integrity. Reinforcements may take the form of fibrous scrims, fibrous mats or fibrous webs. For many applications, the reinforcement 18 is made from a relatively strong fiber such as fiberglass. Typically, glass fiber threads are arranged in a criss-cross pattern. The number of threads per inch can be adjusted to provide the desired product properties. The fiber reinforcement strands are regularly spaced across the web and cross-web directions of the foil. Typically, spacing patterns include but are not limited to 4×4 (four strands per inch in both directions), 3×3, 2×2, 4×2 and 3×2. Typical patterns are rectangular and diamond (note reinforcement 18 shown in FIG. 3). The strands may be materials other than glass which provide the desired properties (e.g. polyester).

Still further alternative reinforcement materials for the foil layer 12 include but are not limited to glass mats, polymer mats and blended mats. The reinforcement 18 may be preattached to the metallic foil. Alternatively loose laid reinforcement may be utilized. In most applications, the foil layer reinforcement 18 provides improved tear resistance, strength and/or acoustical insulating properties. However, in many applications, it should be appreciated that no reinforcement is necessary.

The first facing layer 12 (reinforced or non-reinforced) is attached to the polymer based blanket layer 14 and/or the insulation insert 16 by means of a heat activated adhesive 20. The adhesive 20 utilized may be a thermoplastic sheet or thermoplastic web material that tends to melt and flow at temperatures between 200–350° F. Adhesives 20 of this type are desirable because they can be activated during the molding phase of production. Besides thermoplastic sheets and webs, adhesives 20 such as hot melts, latex and various heat activated resins may be utilized. The adhesive 20 may be a separate layer as illustrated or the adhesive may already be attached to the first facing layer 12 in a dot matrix (i.e. uniform) or sintered (i.e. random) pattern.

The polymer based blanket layer 14 must exhibit the thermal and acoustical properties necessary for the finished product to perform to the requirements of its particular application. Generally, the polymer based blanket layer 14 is made from polyester fiber mat or a polyester fiber mat blend. Other materials that my be utilized include polyolefins, polyethylene, cotton shoddy, nylon, rayon, acrylic, natural fibers (eg. kenaf, hemp) and combinations thereof with or without melt blown microfibers. Such mats generally have a density of between 25–200 g/ft² and more typically 50–150 g/ft² and still more typically 75–125 g/ft².

The insulation insert 16 is provided to furnish extra thermal and/or acoustical insulation over sources of high heat and/or high sound commonly associated with various operating systems of the vehicle (note positioning of insert 16 adjacent heat/sound source H shown in FIGS. 1 and 2). Materials that may be used for the insert 16 include but are not limited to fiberglass, high temperature foams, polymer based blanket products and natural fiber based blanket products. In order to reduce the thickness or bulk of the insulator 10, increase its flexibility for ease of installation and also lower production costs, the insert 16 is sized and positioned in the insulator at one or more selected locations only in order to provide shielding of (a) heat sources which produce hot spots requiring extra thermal protection and/or (b) sound transmitting or generating components that are sources of strong sounds which might otherwise annoy the operator and passengers of the vehicle.

For many applications, strong thermal insulating properties are an essential characteristic of the insert 16. For these applications, the material utilized for the insert 16 must not produce smoke when exposed to temperatures as high as 450° F. Materials such as fiberglass and some higher temperature foams are ideal for such an application. Layered composite materials may also be utilized. Even a secondary layer of foil or like heat reflective material may be utilized as long as the material is capable of dissipating heat and/or acoustical energy from localized areas in the insulator 10.

A second embodiment of the present invention is shown in FIG. 2. Like the first embodiment shown in FIG. 1, this embodiment of the thermal insulator 10 includes a first facing layer 12, a polymer based blanket layer 14 and an insulation insert 16 of the type previously described. The first facing layer 12 is attached to the polymer based blanket layer 14 by an appropriate adhesive 20 of the type described. Additionally, this embodiment includes a second facing layer 22.

Second facing layer 22 provides a smooth durable surface for mounting the insulator 10 against a vehicle component such as a fire wall, fender well, drive shaft tunnel or passenger compartment floor pan. A number of readily available materials may be utilized to construct the second facing 22. Such materials include polyester, polypropylene, rayon, nylon, glass, metal foil and any combinations thereof (eg. polyester and rayon). Both the first and second facing layers 12, 22 may also be treated to provide enhancement of desirable properties. Accordingly, the facing layers 12, 22 may be chemically treated, for example, with moisture barriers, flame retardants, biocides and colorants (eg. dark gray or black). The second facing layer 22 may have a weight of 0.25 to 3.0 oz/yd²(eg. 1.25 oz/yd²).

While not specifically shown in FIG. 2, the second facing layer 22 may be reinforced with a scrim of a type similar to that described above with respect to the heat reflective layer 12 provided in the FIG. 1 embodiment. Appropriate adhesives 24 for securing the scrim and second facing layer 22 together and to the polymer based blanket 14 include thermoplastic films and webs of polyethylene, polypropylene, polyester, polyamides and combinations thereof. The adhesive 24 may be a separate layer or already attached to the facing layer 22 in a dot matrix (i.e. uniform) or sintered (i.e. random) pattern. Alternatively, a hot melt adhesive or a latex adhesive may be utilized.

As should be further appreciated from viewing FIG. 2, the polymer based blanket layer 14 includes a relatively high density outer skin section 26 and a relatively low-density inner section 28. The high density section 26 provides a tough outer "crust" which functions to protect the blanket layer 14 from damage both during installation on a vehicle as well as after it is in place. The low density inner section 28 provides enhanced insulative properties which better shield undesirable heat and noise from the operator/passenger compartment of the vehicle upon which the insulator 10 is installed. Of course, other high density section and low density section layered arrangements may be provided strictly depending upon what is most appropriate for a particular application (eg. a low density layer sandwiched between two high density layers). Multiple density layering of the blanket layer 14 is made possible using various forming and molding techniques including using cooperating platens or rolls at differing temperatures and/or layers of polymer materials having differing melting points. Exemplary forming and molding techniques of this type are described in detail in U.S. patent application Ser. No. 09/607,478 filed concurrently herewith, entitled Process For Forming A Multilayer, Multidensity Composite Insulator, and now U.S. Pat. No. 6,572,723. The full disclosure of this document is incorporated herein by reference.

In accordance with yet another aspect of the present invention, the thermal insulation insert 16 in the insulator 10 shown in FIG. 1 is fully encapsulated between the first facing layer 12 and the polymer based blanket material layer 14. The thermal insulation insert 16 in the insulator 10 shown in FIG. 2 is fully encapsulated within the polymer based blanket layer 14. By encapsulating the insert 16 in this manner, any dust released by the insert during bending and manipulating of the insulator 10 during installation on a vehicle is trapped in the blanket layer 14. There the dust is prevented from contacting the installers and causing possible skin irritation. Thus, convenience as well as comfort and ease of handling are greatly enhanced.

Generally, any embodiment of the insulator 10 of the present invention may be manufactured in accordance with the following process. The polymer based blanket material 14, made up of one or more layers of material having the same or differing softening temperatures, (eg. a VersaMat 4000 polyester blanket of approximately 100 g/ft²) is cut to desired size. The thermal insulation insert 16 and the first facing layer 12 are also cut to the desired dimensions. If a second facing layer 22 is required, it too is cut to desired size. The layers 12, 14, 16 and 22 (if present) are then all brought together with the insulator insert or inserts 16 positioned in the proper location relative to the blanket layer 14. The composite structure including the first facing layer 12, polymer based blanket layer 14 and insulation insert 16 (and second facing layer 22) are then preheated to a temperature that allows the composite to be molded and that activates the appropriate adhesive 20 and 24. The composite structure is then placed into the mold and molded into a desired shape. The finished part or insulator 10 cools and sets and then is removed from the mold. The insulator 10 may be trimmed to size during the molding process or after molding. Of course, the insulator 10 could also be produced in a continuous process.

The insulator 10 is relatively easy to install on a vehicle. The insulator 10 is relatively light weight and may be easily manipulated with bending or folding into a mounting position such as against the floor pan of the vehicle passenger compartment. There the insulator 10 may be mounted in position by mechanical fasteners, adhesives or the like in accordance with approaches known well in art.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, while the insulator 10 of the present invention is described for use as an automotive insulator, it should be appreciated that it is appropriate for other applications requiring acoustical and/or thermal insulative properties such as in appliances (eg. dishwashers, clothes dryers, refrigerators and freezers) and in commercial and residential sound proofing for buildings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An automobile acoustical and thermal insulator, comprising a multilayer composite including (a) a fibrous first facing material layer, (b) a fibrous polymer based blanket layer and (c) an insulation insert encapsulated by said first facing material layer and said fibrous polymer based blanket layer, said insulation insert being constructed from a material selected from a group consisting of fiberglass, foam, polymer based blanket material, natural fiber based blanket material and combinations thereof.

2. The insulator of claim 1, wherein said fibrous polymer based blanket layer is selected from a group of materials consisting of polyester, polyolefin, polyethylene, cotton shoddy, nylon, rayon, acrylic, natural fibers including kenaf and hemp, and combinations thereof with and without melt blown microfibers.

3. The insulator of claim 1, wherein said fibrous polymer based blanket layer includes a relatively high density section and a relatively low density section.

4. The insulator of claim 1, wherein said insulation insert is positioned only at selected locations in said insulator to provide shielding of heat sources and/or sound sources.

5. The insulator of claim 1, wherein said first facing layer includes a heat activated adhesive to secure said first facing layer to said fibrous polymer based blanket layer.

6. The insulator according the claim 1, wherein the insulation insert is a first insulation insert, and further including a second insulation insert encapsulated by said first facing material layer and said fibrous polymer based blanket layer adjacent to the first insulation insert.

7. The insulator according the claim 1, wherein the insulation insert includes at least one recessed portion adapted for matching with an adjacent structure for which enhanced protection from heat or sound transmission is desired.

8. The insulator of claim 1, wherein said first facing layer is constructed from a heat reflective metallic foil having a thickness of between substantially 0.5–5.0 mil.

9. The insulator of claim 8, wherein said metallic foil includes a reinforcement.

10. The insulator of claim 9, wherein said metallic foil reinforcement is selected from a group of materials consisting of a fibrous scrim, a fibrous mat and a fibrous web.

11. The insulator of claim 10, wherein said reinforcement is made from glass fiber threads arranged in a criss-cross patter.

12. The insulator of claim 1, further including a second facing layer.

13. The insulator of claim 12, wherein said second facing layer includes a scrim.

14. The insulator of claim 12, wherein said second facing layer is selected from a group of materials consisting of polyester, polypropylene, rayon, nylon, glass, metal foil and mixtures thereof.

15. The insulator of claim 14, wherein said beat activated adhesive is selected from a group of materials consisting of thermoplastic sheet, thermoplastic web, hot melt, latex and heat activated resins.

16. The insulator of claim 13, wherein said first facing layer and/or second facing layer is treated with a fire retardant, a biocide and/or a colorant.

17. The insulator of claim 10, wherein said second facing layer includes a heat activated adhesive to secure said second facing layer to said fibrous polymer based blanket layer.

18. The insulator of claim 17, wherein said heat activated adhesive is selected from a group of materials consisting of thermoplastic sheet, thermoplastic web, hot melt, latex and heat activated resins.

* * * * *

UNITED STATES PATENT AND TRADEMARK OFFICE
CERTIFICATE OF CORRECTION

PATENT NO. : 6,955,845 B1
DATED : October 18, 2005
INVENTOR(S) : Poole

It is certified that error appears in the above-identified patent and that said Letters Patent is hereby corrected as shown below:

Column 8,
Line 30, "beat" should be -- heat --.

Signed and Sealed this

Eighteenth Day of April, 2006

JON W. DUDAS
*Director of the United States Patent and Trademark Office*